UNITED STATES PATENT OFFICE.

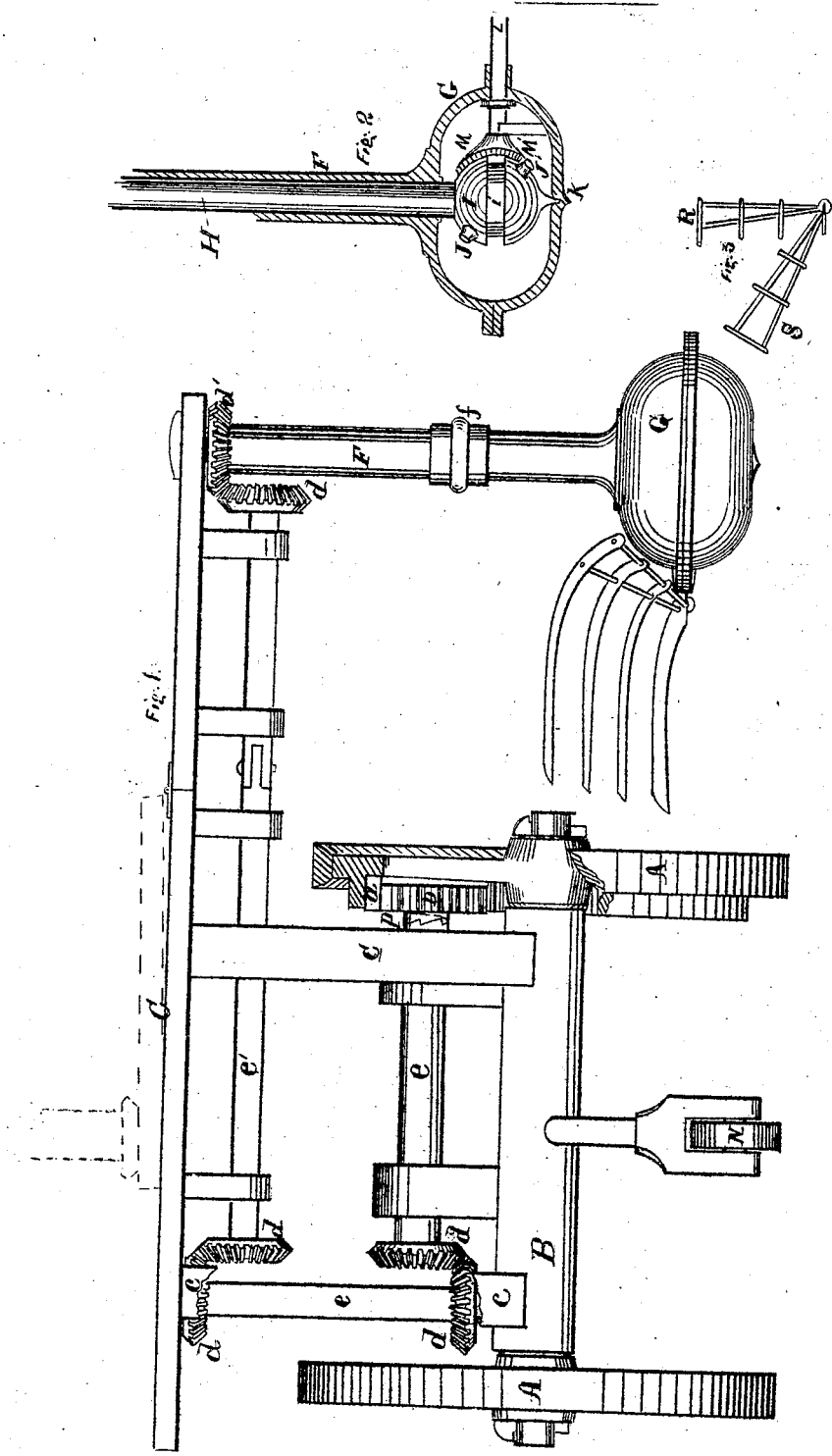

EDWIN F. PAGE, OF BROOKLYN, NEW YORK.

IMPROVEMENT IN HARVESTERS.

Specification forming part of Letters Patent No. 48,988, dated July 25, 1865.

*To all whom it may concern:*

Be it known that I, EDWIN F. PAGE, of the city of Brooklyn, in the county of Kings and State of New York, have invented a new and useful Improvement in Reaping-Machines; and I do hereby declare the following to be a full, clear, and exact description of the same, reference being had to the accompanying drawings, making a part of this specification, in which—

Figure 1 is a rear elevation of my machine; Fig. 2, a vertical section of the mechanism operating the cradle, and Fig. 3 is a diagram illustrating the action of the cradle in gathering and depositing the gavel.

My invention consists in the novel arrangement of mechanism by means of which an instrument similar to the common grain-cradle is operated by machinery, cutting and depositing the grain in a manner similar to that of the ordinary cradle operated by hand.

That others may understand the construction and operation of my machine, I will more particularly describe it.

A A are the bearing-wheels. B is the axle. C is a platform elevated above the axle and supported upon the standards $c\ c$, one of which is represented as broken for the purpose of showing the mechanism behind it. One of the wheels A has attached to it the gear-wheel $a$, which drives the pinion D, which, in turn, by means of the bevel-gears $d\ d\ d\ d\ d'$ and the shafts $e\ e\ e'$, operates the cutting mechanism of the machine. The bevel-gear $d'$ is attached to the hollow sleeve F and causes it to rotate. The sleeve F is supported by the collar $f$ and suitable braces, (not shown,) which connect said collar to the outer end of the platform C. At the lower end of the sleeve F is the hollow case or shell G, bearing the cradle in its revolution. Inside of the sleeve F is the shaft or rod H, which is rigidly attached to the platform at its upper end and does not revolve. At the lower end of H, and within the case G, is the globe or ball I, having the equatorial channel $i$, the two studs J J', and the pivot K upon its surface.

The cradle is made in a manner similar to the ordinary hand-cradle used for cutting grain, with the exception that instead of a snath the scythe is attached to the end of a shaft, L, which passes through a suitable box on the side of the case G, and finally rests in the channel or groove $i$.

Near the inner end of L are the two arms M M', which are of a shape conformable to the surface of I, so that they at all times lie in contact, or nearly so, with said surface.

The shaft L may have any necessary supports within the case G to insure its uniformity of action and its durability.

The supplemental wheel N is added simply for the purpose of adding steadiness to the machine and prevent it from tilting backward. The tongue projects from the side opposite to that shown in Fig. 1, and, together with the driver's seat, &c., is not shown.

The operation of my machine is as follows: For convenience in transporting the machine to and from the field, &c., I make a joint in the platform C and also in the upper horizontal shaft, $e'$, so that the outer end of C, with the cradle and attachments, may be turned up upon that part of C which is above the axle, as shown in red lines in Fig. 1. I also provide a clutch, P, by means of which the pinion D may be thrown out of gear and rendered inoperative. It is evident that any other system of gearing than the one represented may be used for propelling the reaping devices, and such changes may be made in that respect as experience or convenience may dictate. When the field is reached and the mechanism adjusted for operation, the machine is put in motion with the following result: The movement of the driving-wheel is communicated through the intermediate gearing to the sleeve F, the revolution of F causing G to revolve; also, the cradle swings or revolves around the same axis, being carried by G. In driving, the machine is moved so that the outer side of G is almost in contact with the standing grain, so that the ground beneath the wheels, between the wheels and the case G, and beneath the case G is open and clear. The scythe then cuts during that part or arc of its revolution which lies outside of the case G. The cutting position of the scythe and cradle is shown at R, Fig. 3. The grain as it is cut is gathered by the cradle, the butts standing upon the upper surface of the scythe-blade, and standing inclined slightly backward, resting against the fingers of the cradle. The position of the stalks, as well as the inertia of the grain, tends to secure it there. When the cradle has made a part of its revolution the arm M comes in contact with the stud J, and the cradle is tripped or thrown forward into the position shown in Fig. 1, and also at S in Fig. 3. The consequence is that the grain is thrown from the cradle upon the ground in a compact gavel, ready for binding. This may take place at any convenient portion of the revolution of the cradle. After discharging the gavel the still further revolution of the cradle brings the arm M' in contact with the stud J', and the cradle is again brought up into the upright position R in time for another sweep through the standing grain. The operation of tripping and restoring the position of the cradle being repeated at each revolution of the case G, I obtain a movement and result closely imitating the operation of cradling in the ordinary or old-fashioned way.

Having described my invention, what I claim as new, and desire to secure by Letters Patent, is—

1. The combination and arrangement of the arms M M' of the cradle shaft or handle with the studs J J' on the stationary shaft I, whereby the cradle is made to stand upright while cutting the grain and to tilt forward and deliver the cut grain, as set forth.

2. The combination and arrangement of the shaft H, head I, studs J J', sleeve F, and case G, or their equivalents, for the purpose of carrying and operating the cradle T, substantially as set forth.

3. The jointed platform C, in combination with the jointed shaft $e'$, substantially as set forth, for the purpose described.

EDWIN F. PAGE.

Witnesses:
D. K. PAGE,
JOHN H. MILLS.